UNITED STATES PATENT OFFICE.

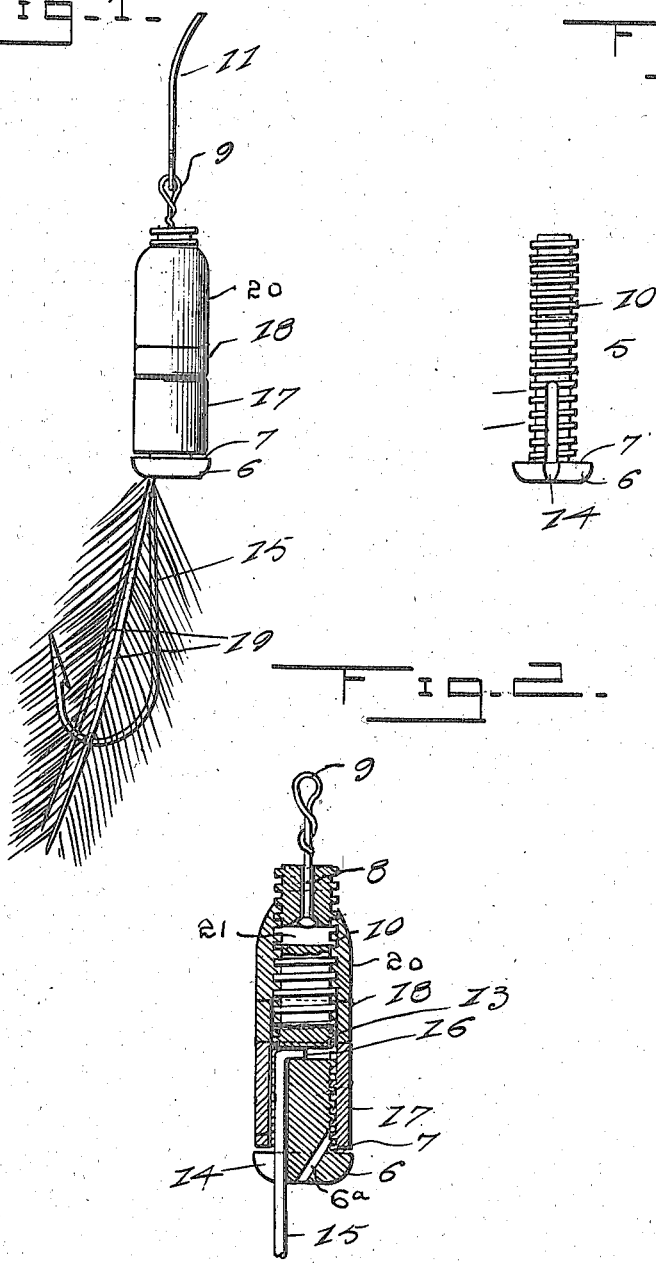

THOMAS ELLSWORTH KING, OF FRANCES, WASHINGTON.

FISH-HOOK.

1,264,658.  Specification of Letters Patent.  Patented Apr. 30, 1918.

Application filed July 11, 1916. Serial No. 108,622.

*To all whom it may concern:*

Be it known that I, THOMAS ELLSWORTH KING, a citizen of the United States, residing at Frances, in the county of Pacific and State of Washington, have invented certain new and useful Improvements in Fish-Hooks; and I do hereby declare the following to be a full, clear, and exact description of the invention, such as will enable others skilled in the art to which it appertains to make and use the same.

This invention relates to fish hooks, and has for its object to provide a fish hook holder adapted to be permanently secured to the end of a fishing line and including means for rigidly and detachably securing a hook and artificial bait or flies.

With this and other objects in view, the invention consists in the novel construction, combination and arrangement of parts as will be hereinafter specifically described, claimed, and illustrated in the accompanying drawing, in which:

Figure 1 represents a side elevation of the improved fish hook and holder,

Fig. 2 represents a longitudinal sectional view through the holder,

Fig. 3 represents a side elevation of the fish hook holder, the sleeve and ring nut being removed.

Referring to the drawing in detail, wherein similar reference numerals designate corresponding parts throughout the several views, the numeral 5 indicates generally the body of the holder, which is preferably of cylindrical formation and is provided at one end with a head 6 defining a stop flange or shoulder 7. The head and adjacent portion of the body are formed with an oblique opening 6ª, which terminates in the zone of the shoulder 7, and the end of the body opposite the head 6 is formed with an axial opening receiving the shank 8 of the loop 9, adapted to be permanently secured to a fishing line 11. The inner end of the axial opening communicates with a diametrical opening 21 formed in the body through which the shank of the loop may be inserted, and the inner terminal of the shank is formed with a head whereby it is prevented from being withdrawn from the axial opening. The body is formed throughout its length with external screw threads 10 and intermediate its ends is formed with an opening 13 communicating with alined recesses 14 formed in the body and head.

The shank 15 of a preferred type of fish hook is formed with an angular terminal 16, removably positioned in the central opening 13 in the body, and the adjacent portion of the shank lies in the central recess 14. An internally screw threaded sleeve 17 is fitted on the screw threads of the body, engages the shoulder 7 and rigidly secures the hook 15 upon the holder. A sleeve 18 having a plane bore is slidably mounted upon the body and is engaged with the sleeve 17. A second internally screw threaded sleeve 20 is fitted upon the body and against the sleeve 18 and covers the diametrical opening 21 in the body. Flies or artificial bait 19 are positioned in the opening 13 in the body 5, extend downwardly through the recesses 14 and conceal the hook 15. Flies may also be positioned in the opening 6ª and held against the flange or shoulder 7 by the sleeve 17.

What is claimed is:

A fish hook holder including a longitudinally grooved and externally screw threaded body having spaced diametrical openings and a longitudinal opening communicating with one of the diametrical openings, a head at one terminal of said body, a fish hook including an angular shank engaged in the longitudinal groove and one of the diametrical openings, an internally threaded sleeve fitted on said body abutting said head and securing the shank of said hook, said body having an oblique opening in the threaded end adapted to receive artificial bait and terminating between the sleeve and body, a headed looped shank received within the longitudinal opening and terminating in the other diametrical opening, and an internally screw threaded sleeve fitted on said body and closing the second-mentioned opening.

In testimony whereof I affix my signature in presence of two witnesses.

THOS. ELLSWORTH KING.

Witnesses:
CHAS. KIRSCH,
FRANK FOSTER.